INVENTOR
Tatsuo KURATOMI
Yoshifumi YATSURUGI

BY
ATTORNEY

United States Patent Office 3,577,220
Patented May 4, 1971

3,577,220
PROCESS FOR PRODUCTION OF MONOSILANE (SiH₄) AND GERMANIUM HYDRIDE (GeH₄)
Tatsuo Kuratomi, 4-2-18 Hamatake, Chigasaki, and Yoshifumi Yatsurugi, 6-507, 7-2-chome, Tsujido Nishi-kaigan, Fujisawa, both of Kanagawa, Japan
Filed Oct. 29, 1968, Ser. No. 771,405
Claims priority, application Japan, Oct. 31, 1967,
42/69,592
Int. Cl. C01b 33/04; C22b 41/00
U.S. Cl. 23—204
9 Claims

ABSTRACT OF THE DISCLOSURE

A process for producing monosilane ($SiH_4$) comprising reacting magnesium silicide with a concentration of ammonium thiocyanate in liquid ammonia at ambient temperature and pressure. Also, a process for producing germanium hydride ($GeH_4$) comprising reacting magnesium germanide with a concentration of ammonium thiocyanate in liquid ammonia at ambient temperature and pressure.

---

Figure 1:
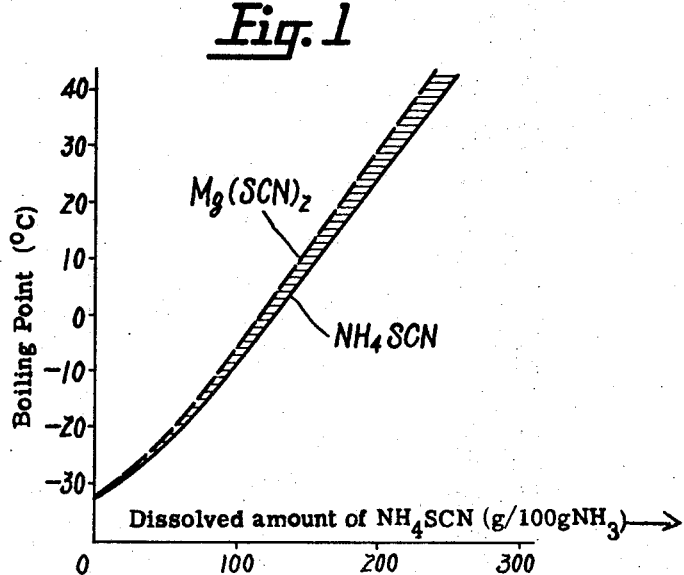

The present invention relates to a process for producing silane, particularly it relates to a process for producing monosilane ($SiH_4$). Monosilane is, as well known, useful for the preparation of highly purified polycrystalline and single crystalline silicon, silicon nitride, silicon dioxide, etc. The present invention further relates to a process for preparing germanium hydride.

Prior to the present invention, it has been reported by W. C. Johnson et al. (J. Am. Chem. Soc., 57, 1349 (1935)) and H. Clasen et al. (German Pat. No. 926069) that silane is generated by reacting magnesium silicide (Mg2Si) with ammonium halogenide in liquid ammonia. As the ammonium halogenide, ammonium bromide (NH4Br) is used in the process reported by W. C. Johnson et al. and ammonium chloride in the process reported by H. Clasen et al.

In these prior processes, the solubility of ammonium halogenide in ammonia at a temperature about the boiling point of ammonia solution of ammonium halogenide under an ambient pressure is only one mol per scores, therefore, it is necessary to increase the volume of the solution in order to accelerate the reaction of the solution with magnesium silicide which is insoluble in the said solution. In order to avoid this disadvantage, it is necessary to elevate the temperature of the solution whereby the amount of dissolved ammonium salt is increased. This conception was reduced to practice by H. Clasen by using ammonium chloride. However, the elevation of the temperature for increasing the solubility of ammonium chloride is inevitably accompanied by a remarkable elevation of pressure, thus, the reaction must be carried out under a high pressure in an autoclave. Moreover, when ammonium halogenide is used, the solubilities of non-gaseous reaction product of magnesium bromide (MgBr2) or magnesium chloride (MgCl2) and ammonium halogenide in liquid ammonia are considerably low, therefore, when the reaction of generating silane, i.e. reaction (I) or (II).

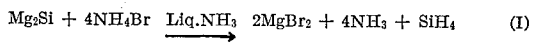

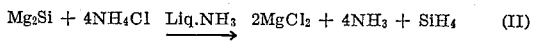

is once commenced, the starting material and the produced magnesium halogenide become thick and further become pumice-like according to the progress of the reaction. Moreover, the produced magnesium halogenide covers the surface of magnesium silicide. Thus, the reaction velocity is caused to be reduced and the generation yield of silane is also reduced by the decrease of reacting probability of the starting material. Furthermore, the recovery of ammonia after the completion of the reaction is difficult because the reaction mixture consisting mainly of thick or pumice-like magnesium halogenide causes the formation of stable ammoniate, e.g. $MgCl_2 \cdot 6NH_3$. As the result of various studies, the present inventors have invented a novel process for producing silane, which solves almost all of the disadvantageous problems of the above-mentioned known processes. That is to say, the present invention is a process for producing monosilane characterized by reacting magnesium silicide with ammonium thiocyanate (rhodanate) in liquid ammonia at a temperature above —33° C. i.e. the boiling temperature of ammonia under an ambient pressure, and recovering thus generated monosilane.

The main characteristics of the present invention are as follows;

(1) The reaction can be carried out at an ambient temperature under an ambient pressure by electing the amount of the reactants dissolved in liquid ammonia, (2) ammonium salt and non-gaseous reaction product are soluble in liquid ammonia, therefore, not only the reaction velocity is remarkably increased comparing with the prior processes, but also the reaction mixture can be treated in its liquid state, (3) comparing with the process using ammonium halogenide, the present process provides a considerably high yield of silane and a recovery of monosilane containing substantially no higher silane, (4) the recovery of ammonia after the completion of the reaction is easy because non-gaseous reaction product has a crystallizing nature, (5) putting together the above-mentioned characteristics, the present invention provides a commercial process for producing silane which is unexpected from the prior processes, and so on.

One object of the present invention is to provide a process for producing silane, of which reaction can be carried out at an ambient temperature under an ambient pressure.

Another object of the present invention is to provide a process for producing silane, of which reaction is carried out at a high reaction velocity.

A further object of the present invention is to provide a process for producing silane, wherein the reaction mixture can be treated in its liquid state and ammonia can be easily recovered after the completion of the reaction.

A still further object of the present invention is to provide a commercial process for producing silane, which can be carried out continuously.

A still further object of the present invention is to provide a process for producing silane, wherein monosilane is generated at a remarkably high yield and the generation of higher silanes is advantageously restricted.

A still further object of the present invention is to provide a novel process for producing germanium hydride.

Other objects of the present invention can be obvious from the disclosure in the specification.

Figure 2:
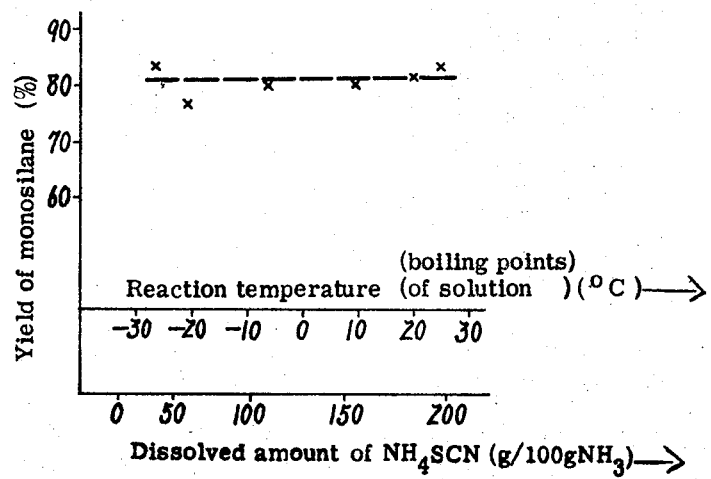

In the accompanied drawing;

FIG. 1 shows graphically the relation between the boiling point of liquid ammonia solutions of magnesium thiocyanate and of ammonium thiocyanate and the dissolved amount of the said thiocyanates, and FIG. 2 shows graphically the relation among the dissolved amount of ammonium thiocyanate in liquid ammonia, boiling point of the solution and yield of silane.

In FIG. 1, the amount of ammonium salt dissolved in 100 g. of liquid ammonia is plotted on the latitude and the boiling point of the ammonia solution on the longitude. The solid line shows the case of ammonium thiocyanate, the perforated line, the case of magnesium thiocyanate and the striped part the case of a mixture of ammonium thiocyanate and magnesium thiocyanate. As obvious from FIG. 1, it is understood that when the reaction is carried out at the boiling point of the liquid ammonia solution of ammonium salt used as a starting material, the boiling point of the reaction mixture is almost the same before and after the reaction. Moreover, as shown in FIG. 2, the generation yield of silane is almost stable although the reaction temperature under an ambient pressure is altered by altering the concentration of the ammonium salt. This fact is an entirely novel result unexpected from the prior processes. The elevation of the boiling point of the liquid ammonia solution of ammonuim thiocyanate is about 1° C. as expected from thermodynamic calculation.

Thus, according to the present invention, the production of silane in liquid ammonia is accomplished at an ambient temperature under an ambient pressure without controlling the temperature by using refrigerating apparatus. These reaction conditions have never been expected in the known processes.

An understood from FIG. 1, the solubilities of ammonium salt, magnesium salt and the mixture thereof of the present invention in liquid ammonia are considerably large. On the other hand, that of ammonium halogenide is small when compared with that of the ammonium salt of the present invention. Moreover, magnesium halogenide is almost insoluble in liquid ammonia. Accordingly, the non-gaseous reaction mixture can be treated in its liquid state in the present process which was impossible in the prior processes.

Further, the fact shown in FIG. 1, i.e. a possibility of elevating the reaction temperature, a subsequent possibility of elevating the concentration of reactants and a high solubility of non-gaseous product, results in a remarkable acceleration of the reaction velocity.

According to the present invention, as shown in the example, the yield of silane is improved by more than 10%, and besides the generated silane is consisted almost entirely of monosilane. In contradistinction, according to the prior processes more than 4–5% of higher silanes ($Si_2H_6$, $Si_3H_8$, $Si_4H_{10}$, . . .) are always accompanied, thus, the generating yield of monosilane is low.

According to the prior processes, the produced magnesium halogenide forms stable ammoniate (e.g. $MgCl_2 \cdot 6NH_3$, $MgCl_2 \cdot 4NH_3$ and $MgCl_2 \cdot 2NH_3$), for example, $MgCl_2 \cdot 2NH_3$ is stable until about 200° C. and such ammoniates inhibit the recovery of liquid ammonia after the completion of the reaction. Moreover, the magnesium halogenide, which is produced by the reaction of magnesium silicide and ammonium halogenide, is insoluble in liquid ammonia, and it is remarkably swollen in its volume according to the progress of the generating reaction of silane. Finally, it becomes a porous material and adsorbs ammonia and silane stably. On the contrary, according to the present invention, the non-gaseous reaction product is not only soluble in liquid ammonia, but also is crystallized according to the elevation of the concentration by evaporating ammonia, thus, ammonia can be easily recovered after the completion of the reaction. Moreover, even if the non-gaseous product is crystallized during the reaction, the said product does not adsorb so much amount of the generated silane as the porous product in the prior processes, and the silane adsorbed on the crystal can be easily eluted. Thus, the generating yield of silane is favorably increased.

In exemplarily practicing the process of the present invention, the reaction is carried out in a vessel having a gas outlet which is connected with cold traps. Ammonium thiocyanate is dissolved in liquid ammonia in the vessel and magnesium silicide is added to the solution. The generated gaseous silane is introduced through the gas outlet to cold traps where ammonia and higher silane are separated from monosilane, and purified monosilane is finally recovered.

From the reaction residue, ammonia is recovered by evaporation and the crystallized magnesium thiocyanate is converted again into ammonium thiocyanate by treating with a preferable ammonium salt such as ammonium chloride, ammonium sulfate, etc. Alternatively, the reaction residue is added with such an ammonium salt, and resulting precipitate of magnesium salt is separated. Then, the obtained ammonia solution containing the reproduced ammonium thiocyanate is circulated to the next operation.

Applying this circulation procedure, the process of the present invention can be operated continuously. For example, the reaction mixture from which monosilane has been generated is transferred continuously from the reaction vessel to a thiocyanate-recovering vessel.

To the latter vessel ammonium sulfate is fed in an amount equivalent to that of magnesium thiocyanate in the reaction residue. The resulted precipitate of magnesium sulfate is separated and thus obtained liquid ammonia solution of ammonium thiocyanate is recycled to the reaction vessel. The separated magnesium sulfate is dried at a temperature above 200° C. and the further recovered ammonia is also recycled to the reaction system.

As to the concentration of ammonia thiocyanate in liquid ammonia, it may possibly be until saturation, however, preferably 100–300 g./100 g. $NH_3$.

The amount of magnesium silicide added is, preferably, slightly less than that theoretically calculated on the basis of ammonium thiocyanate. Favourably, the amount of ammonium thiocyanate is excessive by about 10% to 50% to that of magnesium silicide. The reaction is carried out favourably at the boiling point of the ammonia solution. Of course, it can be also carried out at a temperature below the boiling point, but such an operation gives no advantageous result. When a favourable concentration of ammonium thiocyanate is elected, the reaction temperature, i.e. boiling point, is −20 to 60° C. This is far higher than the boiling point of liquid ammonia, i.e. −33° C.

Theoretically, the reaction may be carried out at a temperature below about 200° C., i.e. below the decomposing point of silane however, the viscosity of liquid ammonia saturated with ammonium thiocyanate at a temperature above about 60° C. become so high that the reaction velocity is considerably reduced. Therefore, a reaction temperature above about 60° C. gives no advantageous result.

As stated before, the present process is favourably carried out under an atmospheric pressure because ammonium thiocyanate is soluble in liquid ammonia and consequently the boiling point of the solution is elevated. Naturally, the present process can be operated under an elevated pressure, however, such an operation gives no remarkably advantageous result but requires more expensive apparatus. These mild reaction conditions are characteristic to the present invention. The present invention is illustrated but not limited by the following example. Many varieties and alternations are possible within the scope of the present invention without changing the gist of the present invention.

EXAMPLE 1

Magnesium silicide was prepared according to the process reported by W. C. Johnson et al., i.e. silicon powder and 10%-excessive amount of magnesium powder were treated at 500–550° C. in hydrogen atmosphere for 30 min.

A series of operations for generating silane was carried out using ammonium chloride, ammonium bromide and ammonium thiocyanate respectively as the ammonium salt. About 50 cc. of liquid ammonia and 2 g. of magnesium silicide were used. The generation of silane was carried out by adding ammonium salt in an amount excessive theoretically by 50% to react completely with the above-mentioned amount of magnesium silicide to the liquid ammonia and then incorporating the magnesium silicide to the solution. The reaction temperature was the boiling point of the resulted liquid ammonia solution. The generated gas was purified by passing through cold traps of Dry Ice-alcohol and solid petroleum ether to remove ammonia and trace amount of impurities, and monosilane was finally recovered by cooling with liquid nitrogen. The recovered monosilane was further purified by several repeating of simple distillation and was determined. The gas condensed in the cold traps and the residues from the simple distillation were neutralized with acid to separate higher silane from ammonia. The separated higher silane was purified by simple distillation and was determined. The reaction residues were treated at a temperature above 100° C. to remove the adsorbed gas. The state of the liquid ammonia solutions after the completion of the reaction was thick in the case of ammonium halogenide, while liquid on which unreacted residue floated in the case of ammonium thiocyanate.

The following table shows the results of the above-mentioned tests. The data is the average of several repeated tests.

TABLE

| Ammonium salt | Prior processes | | The present process, |
|---|---|---|---|
| | $NH_4Cl$ | $NH_4Br$ | $NH_4SCN$ |
| Reaction temperature, °C | −33—−32 | −33—−32 | 20 |
| Yield of $SiH_4$, percent | 70–71 | 69–71 | 81–82 |
| Higher silane (As $Si_2H_6$), percent | 4–5 | 4–5 | Trace |
| Total yield (Conversion ratio), percent | 79–80 | 78–80 | 81–82 |

EXAMPLE 2

Pulverized germanium was reacted with 10% (by mol)-excessive amount of pulverized magnesium in pure hydrogen atmosphere for 5–6 hours at a temperature from 500° C. to 550° C. to prepare magnesium germanide. The preparation of germanium hydride was carried out according to the process of the present invention and that reported. The used amounts of ammonium thiocyanate and ammonium bromide were excessive by 50% (by mol) to that of magnesium germanide. Comparing the results, the yield of the process of the present invention was better by 7–8% than that of the reported process, and the product of the process of the present invention contained only a trace amount of higher germanium hydride such as $Ge_2H_6$, etc.

What is claimed is:

1. A process for producing monosilane, which comprises reacting magnesium silicide with ammonium thiocyanate in liquid ammonia at the temperature of the boiling point of the liquid ammonia solution under an ambient pressure.

2. A process for producing monosilane comprising reacting magnesium silicide with a concentration of ammonium thiocyanate in liquid ammonia at an ambient temperature under an ambient pressure and recovering the produced monosilane.

3. A process according to claim 2, wherein the concentration of ammonium thiocyanate in liquid ammonia is from about 100 g./100 g. $NH_3$ to about 300 g./100 g. $NH_3$.

4. A process according to claim 2, wherein the temperature range is from about −10° C. to about 60° C.

5. A process for producing monosilane comprising reacting magnesium silicide with a concentration of ammonium thiocyanate in liquid ammonia at a temperature of the boiling point of the liquid ammonia solution under an ambient pressure and recovering the produced monosilane.

6. A process according to claim 5, wherein the concentration of ammonium thiocyanate in liquid ammonia is from about 100 g./100 g. $NH_3$ to about 300 g./100 g. $NH_3$.

7. A process for preparing monosilane comprising reacting magnesium silicide with a concentration of ammonium thiocyanate in liquid ammonia at an ambient temperature under an ambient pressure, recovering the produced monosilane, adding ammonium sulfate to the reaction residue, separating precipitated magnesium sulfate and drying it at a temperature above 200° C. and recovering reproduced ammonium thiocyanate.

8. A continuous process for preparing monosilane comprising feeding magnesium silicide to a reaction vessel containing liquid ammonia solution of ammonium thiocyanate at an ambient temperature under an ambient pressure, recovering the generated monosilane, transferring a reaction residue into a recovering vessel, adding ammonium sulfate to the reaction residue, separating precipitated magnesium sulfate and drying it at a temperature above 200° C. and recycling reproduced liquid ammonia solution of ammonium thiocyanate into the reaction vessel.

9. A process for producing germanium hydride ($GeH_4$) comprising reacting magnesium germanide with a concentration of ammonium thiocyanate in liquid ammonia at an ambient temperature under an ambient pressure, and recovering the produced germanium hydride ($GeH_4$).

References Cited

FOREIGN PATENTS 946,105  1/1964  Great Britain _____ 23—204

OSCAR R. VERTIZ, Primary Examiner

H. S. MILLER, Assistant Examiner

U.S. Cl. X.R.

23—18